(12) United States Patent
Aliberti

(10) Patent No.: US 9,689,509 B1
(45) Date of Patent: Jun. 27, 2017

(54) HOSE CLAMPING DEVICE

(71) Applicant: Christopher Aliberti, Scottsdale, AZ (US)

(72) Inventor: Christopher Aliberti, Scottsdale, AZ (US)

( * ) Notice: Subject to any disclaimer, the term of this patent is extended or adjusted under 35 U.S.C. 154(b) by 0 days.

(21) Appl. No.: 15/230,493

(22) Filed: Aug. 8, 2016

Related U.S. Application Data

(60) Provisional application No. 62/356,100, filed on Jun. 29, 2016.

(51) Int. Cl.
| | | |
|---|---|---|
| *A62C 13/76* | (2006.01) | |
| *F16L 3/00* | (2006.01) | |
| *F16L 3/13* | (2006.01) | |
| *B65D 25/20* | (2006.01) | |

(52) U.S. Cl.
CPC .............. *F16L 3/003* (2013.01); *B65D 25/20* (2013.01); *F16L 3/13* (2013.01)

(58) Field of Classification Search
USPC .............................................. 248/75, 79, 82
See application file for complete search history.

(56) References Cited

U.S. PATENT DOCUMENTS

| | | | | |
|---|---|---|---|---|
| 622,246 | A * | 4/1899 | Matheas ................... | E04C 5/10 248/78 |
| 633,899 | A * | 9/1899 | Peacock .................... | E04C 5/10 248/78 |
| 2,108,347 | A | 2/1938 | Quamstrom | |
| 2,189,364 | A * | 2/1940 | Kirsten .................. | A01G 25/00 248/79 |
| 2,591,427 | A * | 4/1952 | Harkey ................... | F16L 3/003 24/339 |
| 3,012,745 | A | 12/1961 | Donovan | |
| 3,667,712 | A * | 6/1972 | Furgueson ............ | A47F 5/0006 248/214 |
| 4,318,519 | A * | 3/1982 | Blevins ................. | D06F 39/083 248/229.26 |
| 5,005,790 | A * | 4/1991 | Harris, III ............ | B65H 75/366 248/213 |
| 5,639,049 | A | 6/1997 | Jennings et al. | |
| 6,041,951 | A | 3/2000 | Blum et al. | |
| 6,311,936 | B1 * | 11/2001 | Herr ........................ | D06F 39/12 138/107 |
| 6,893,067 | B1 * | 5/2005 | Ayala ...................... | E04G 21/04 248/75 |
| 7,255,310 | B2 * | 8/2007 | Niwa ..................... | A61B 1/018 248/51 |
| 8,632,037 | B1 * | 1/2014 | Rael ........................ | F16L 3/003 248/534 |
| 2007/0120023 | A1 * | 5/2007 | Martinez ............... | E02F 9/2275 248/75 |
| 2016/0018022 | A1 * | 1/2016 | Boutin .................... | E03F 1/008 248/75 |

* cited by examiner

*Primary Examiner* — Monica Millner
(74) *Attorney, Agent, or Firm* — Mark Wisnosky

(57) ABSTRACT

A device is described that can be employed to clamp a hose to the interior surface of a vessel intended to receive the liquid discharged from the hose. A one-piece device includes a central region incorporating end pieces that include circular slots that accept a range of hose/tubing sizes and clamp the hose/tubing to the central region. The central region also incorporates a number of clip-type devices at its edges that serve to securely attach the central region to the interior surface of the mouth of a receiving vessel.

3 Claims, 9 Drawing Sheets

HOSE CLAMPING DEVICE

CROSS-REFERENCE TO RELATED APPLICATIONS

This application claims the benefit of U.S. Provisional Patent Application 62/356,100, filed Jun. 29, 2016 entitled "Hose Clamping Device" by the same inventor and hereby incorporated by reference.

BACKGROUND OF THE INVENTION

Technical Field

The present invention relates to a device that can be employed to clamp a hose to the interior surface of the mouth of a vessel intended to receive the liquid discharged from the hose.

Related Background Art

It is frequently necessary to transfer liquids from a first container to a second container. Although the transfer can be effected using mechanical pumps, the force of gravity is often employed to accomplish the transfer by means of a siphon device coupling an elevated source vessel and a lower receiving vessel. A siphon device is most simply a length of hose or tubing connecting the source and receiving vessels. The first end of the hose or tubing is immersed in the liquid in the source vessel to a predetermined depth and the second end is placed within the interior of the receiving vessel. Often, a simple manual pump is inserted in-line between the first and second ends to initiate the liquid flow.

In the case of siphoning flammable liquids such as gasoline, it is important to protect the safety of the operator by ensuring that the ends of the hose or tubing remain in place during the liquid transfer. In particular, the accidental withdrawal of the second end from the receiving vessel causes the liquid to discharge into the area surrounding the receiving vessel, thereby presenting a risk of explosion and fire.

Thus, there is a need for a multi-purpose clamp that can serve to securely attach the discharge end of the siphon hose or tubing to the interior wall of the receiving vessel. A further need exists for the multi-purpose clamp to accommodate any of a variety of receiving vessel configurations.

DISCLOSURE OF THE INVENTION

A device is described that addresses the needs described above. A one-piece device includes a central region incorporating end pieces that include circular slots that accept a range of hose/tubing sizes and clamp the hose/tubing to the central region. The central region also incorporates a number of clip-type devices at its edges that serve to securely attach the central region to the interior surface of a receiving vessel.

The preferred embodiment is a one-piece device molded in a semi-rigid plastic material. The end pieces are attached to the central region through thin hinge sections that allow the end pieces to be folded through a range of angles to accommodate a range of hose/tubing sizes. The clip-type devices attached at the lateral edges of the central region accomplish the following non-limiting list of functions:
1. attach to the interior surface of a bucket-shaped vessel having a rolled edge thicker than the wall of the vessel,
2. attach to the interior surface of the threaded mouth of a vessel having a screw-on top,
3. attach to the interior surface of the mouth of a bottle-shaped vessel.

Those skilled in the art will appreciate that various adaptations and modifications of the preferred embodiments can be configured without departing from the scope and spirit of the invention.

Therefore, it is to be understood that the invention may be practiced other than as specifically described herein, within the scope of the appended claims.

DETAILED DESCRIPTION OF THE INVENTION

Figure 1:
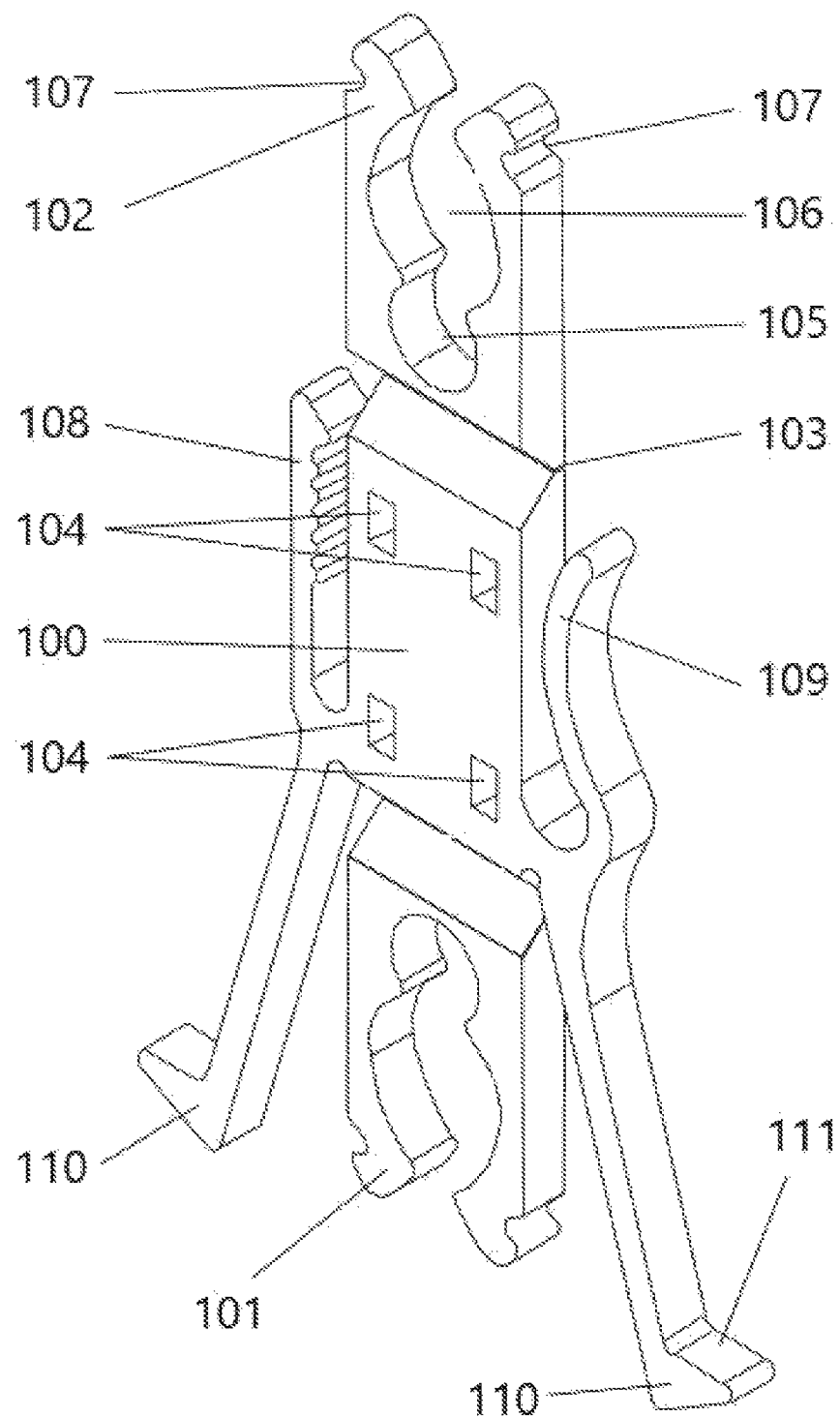
FIG. 1 is an isometric view of the as-fabricated hose clamping device.

FIG. 1 is an isometric view of the as-fabricated hose clamping device. Front 101 and rear 102 end pieces are in the same plane as the central region 100, and are attached to the central region through thin hinge regions, such as 103. Central region 100 includes holes 104 that allow the insertion of flexible straps, such as zip-ties, to secure a hose/tubing to the central region or to secure the central region 100 to a separate support such as a wall, tube, column, etc. Front 101 and rear 102 end pieces include circular 105 and elliptical 106 slots to accommodate a range of hose/tubing diameters. They also include notches 107 that allow the exterior arms of the end pieces to be compressed using flexible straps (not shown) in order to more firmly grip the inserted hose/tubing. Clip-type devices 108, 109 are attached to the central region 100. Spring clips 110 are attached at the bottom of clip-type devices 108 and 109 and are intended to grip the mouth of a bottle and include extensions 111 at the distal end to obviate expulsion of the device by the liquid stream. In a preferred embodiment the hose clamping device of FIG. 1 is molded or stamped as a single piece. In a preferred embodiment the hose clamping device is made from a polymeric material, nonlimiting examples of the polymeric material include Nylon, thermoplastics such as high density polyethylene, acrylic polymers and polyurethane. The device can also be made from metal.

Figure 2:
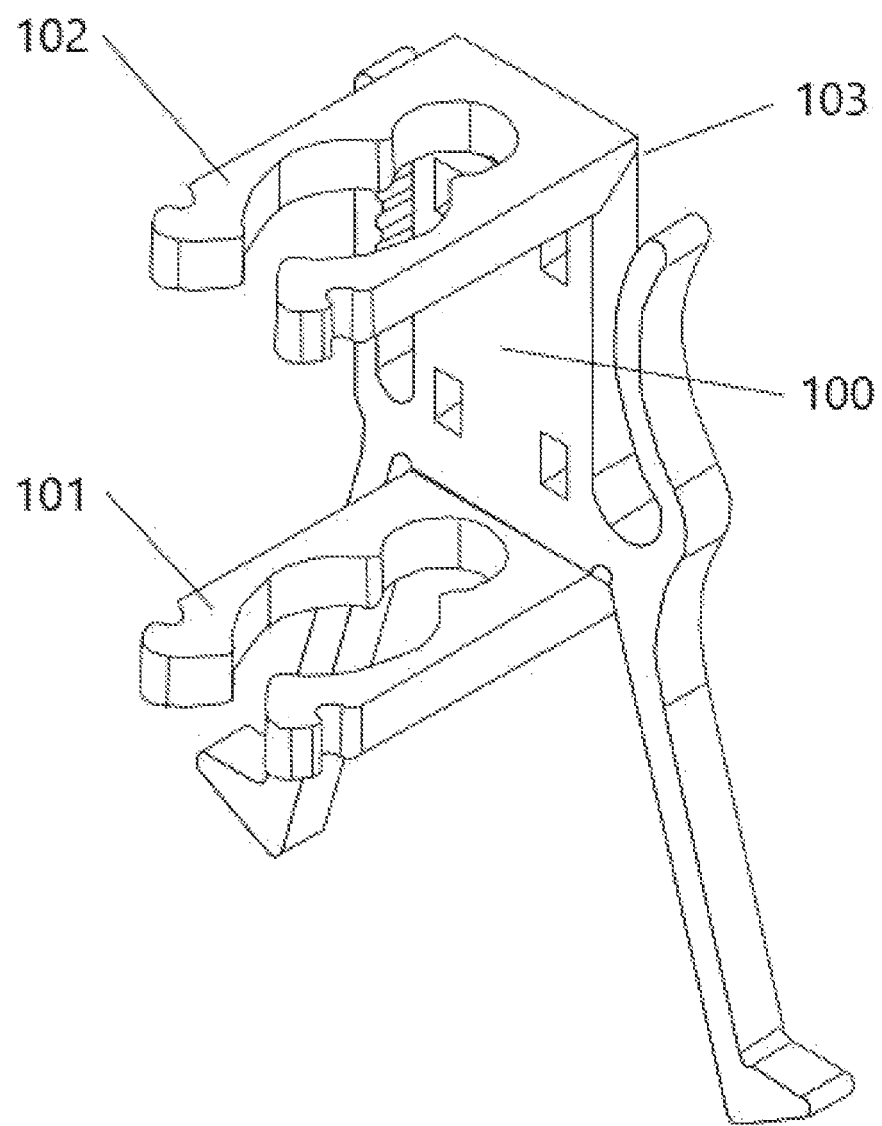
FIG. 2 is an isometric view of the hose-clamping device with end pieces folded into an operating configuration.

FIG. 2 is an isometric view of the hose-clamping device with end pieces 101 and 102 folded into an operating configuration perpendicular to central region 100, and attached to central region 100 by flexible hinges such as 103.

Figure 3:
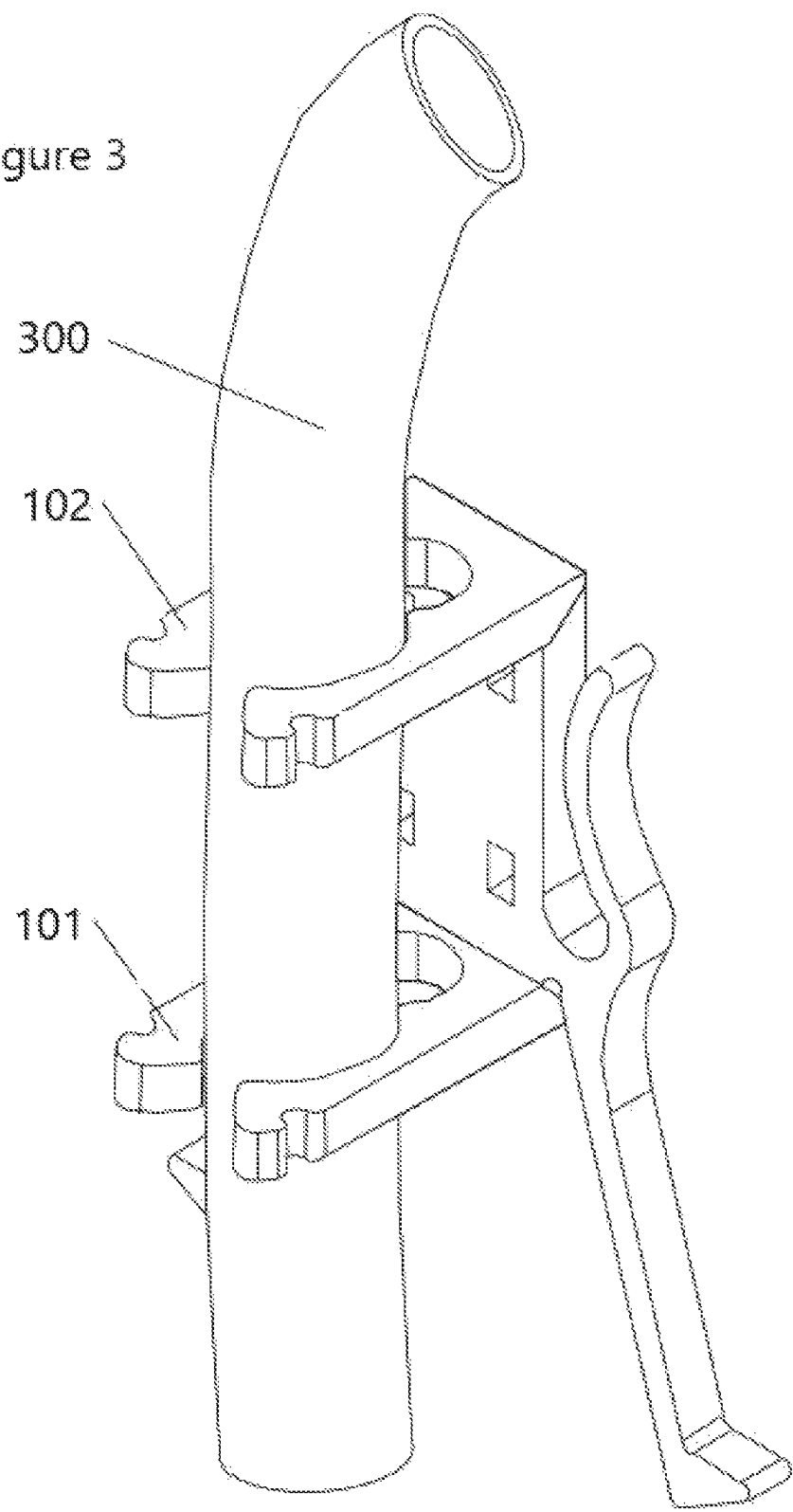
FIG. 3 shows the hose clamping device of FIG. 2 with a section of hose clamped into the folded end pieces.

FIG. 3 shows the hose clamping device of FIG. 2 with a section of hose 300 clamped into the folded end pieces 101 and 102.

Figure 4:
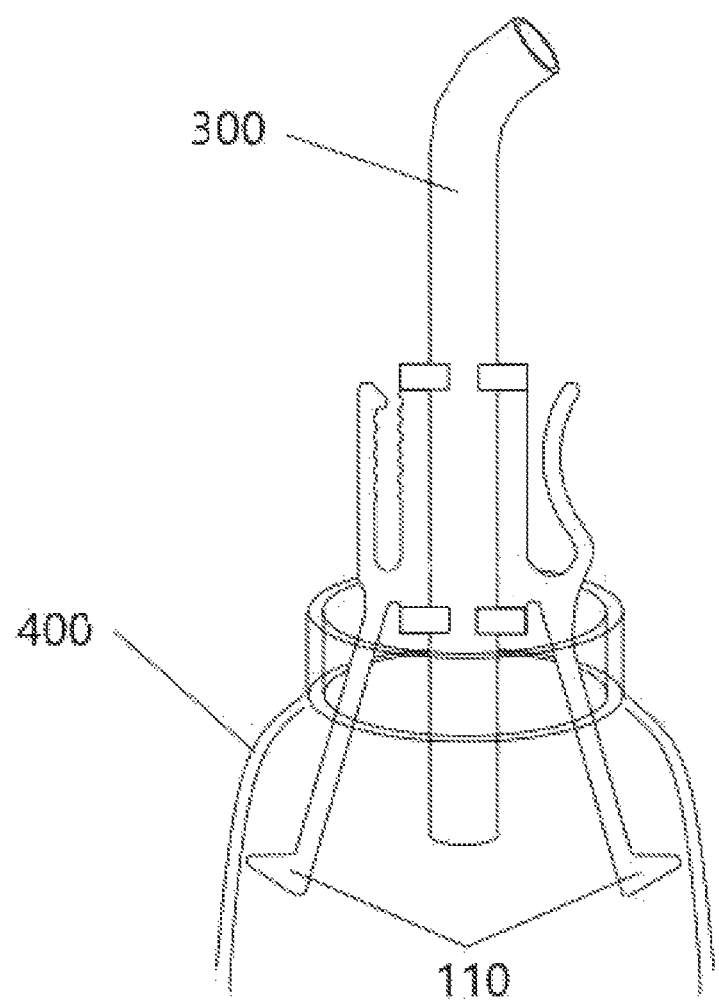
FIG. 4 shows a top view of the hose-clamping device of FIG. 3 attached to the interior surface of a bottle-shaped receiving vessel.

FIG. 4 shows a top view of the hose-clamping device of FIG. 3 attached to the interior surface of a bottle-shaped receiving vessel 400 using spring clips 110.

Figure 5:
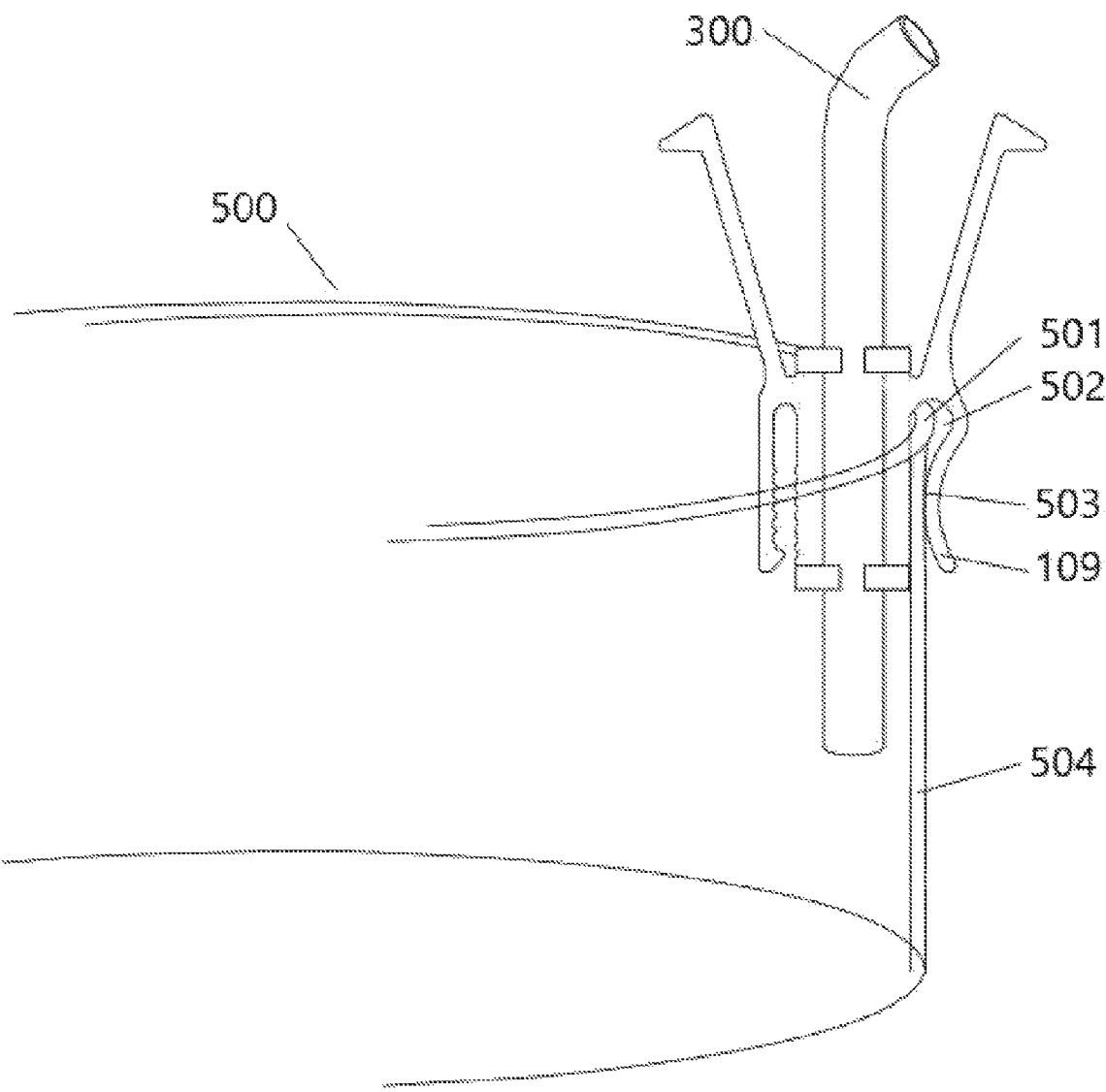
FIG. 5 shows a top view of the hose-clamping device of FIG. 3 attached to the interior surface of a receiving vessel having a rolled edge thicker than its wall.

FIG. 5 shows a top view of the hose-clamping device of FIG. 3 attached to the interior surface of a bucket-shaped receiving vessel 500 having a rolled edge 501 using clip-type device 109 that includes an expanded region 502 to accommodate the rolled edge 501, and an elongated region 503 to grip the wall of the vessel 504.

Figure 6:
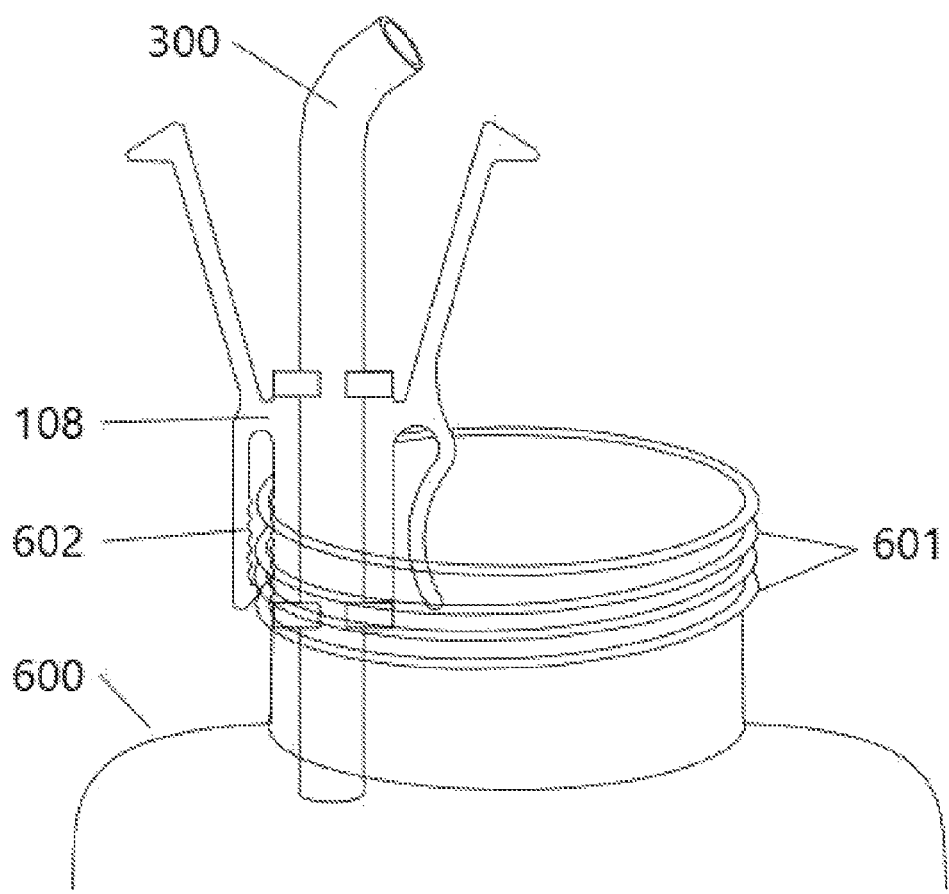
FIG. 6 shows a top view of the hose-clamping device of FIG. 3 attached to the interior surface of a receiving vessel having a screw-on top.

FIG. 6 shows a top view of the hose-clamping device of FIG. 3 attached to the interior surface of a receiving vessel 600 having a threaded region 601 to accommodate a screw-on top (not shown) using a clip-type device 108 having ridged internal surface 602 to engage the threaded region 601. In another embodiment (not shown) the hose-clamping device uses the ridged internal surface to clamp to a correspondingly ridged rim of a container. Such ridges are common on plastic bucket containers.

Figure 7:
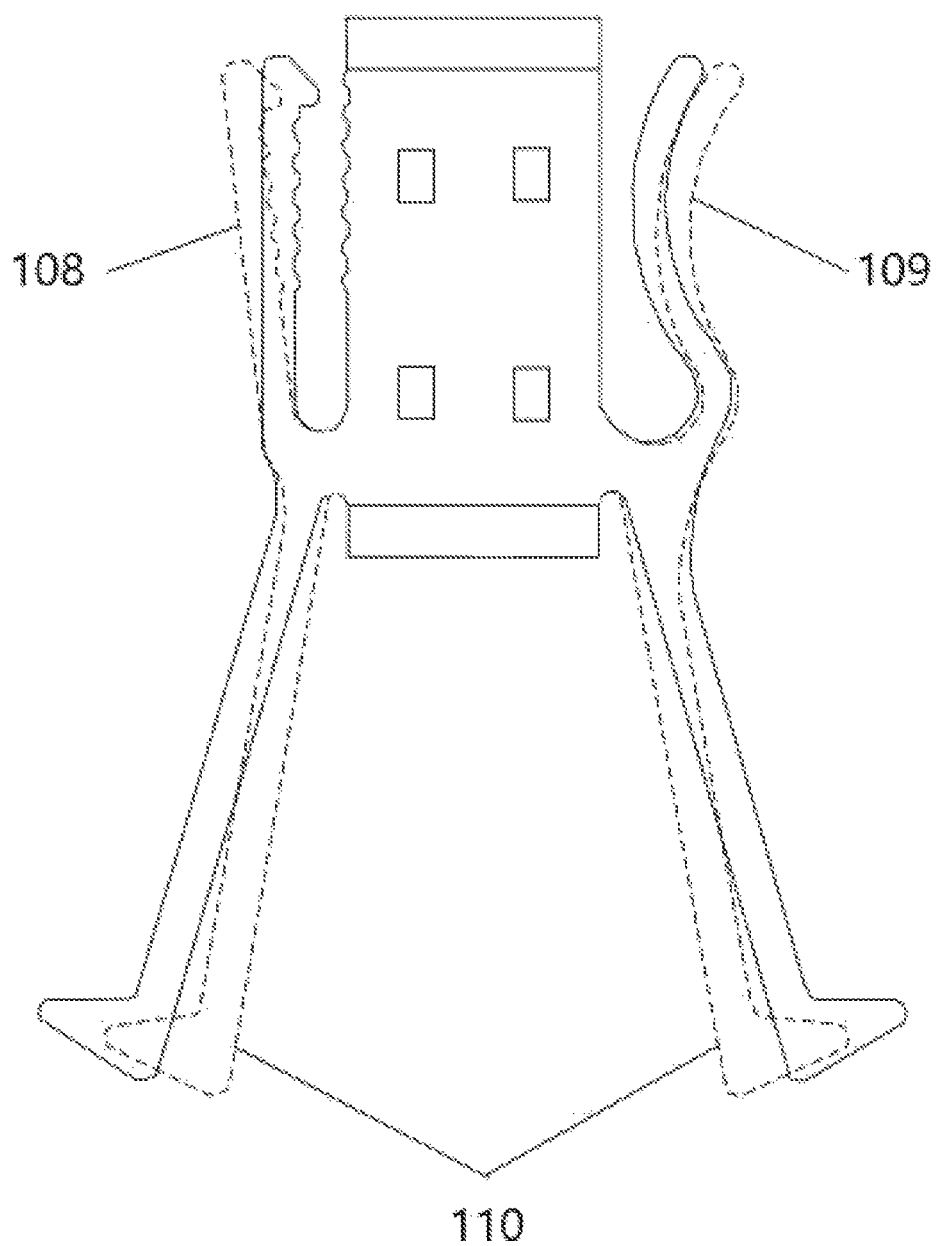
FIG. 7 illustrates the relative motions of the clip-type devices.

FIG. 7 shows a top view of the hose-clamping device of FIG. 3 that illustrates the relative motions of the clip-type devices 108 and 109 when spring-clips 110 are manually compressed, thereby opening clip-type devices 108 and 109 to be more easily attached to and removed from the respective features of the receiving vessel.

Figure 8:
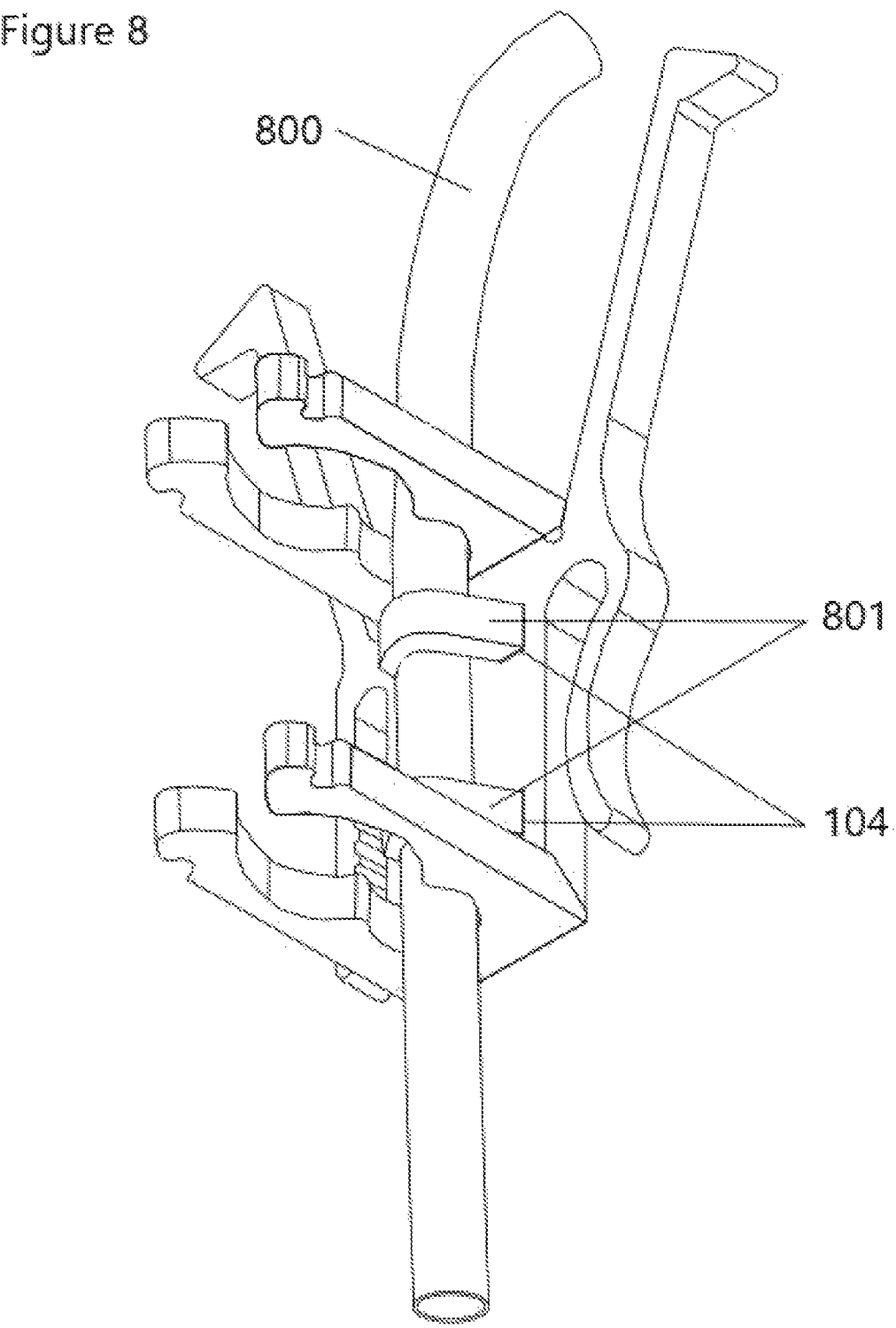
FIG. 8 shows the hose clamping device of FIG. 2 with a section of hose inserted into the folded end pieces and attached to the central region using zip-ties.

FIG. 8 shows the hose clamping device of FIG. 2 with a section of a particularly narrow hose 800 inserted into the folded end pieces and attached to the top surface of the central region using zip-ties 801 inserted through central region holes 104. Alternatively, zip-ties can be inserted through central region holes 104 but beneath the hose in order to attach central region 100 to an external wall, tube, column, etc., located adjacent to the bottom surface of the central region.

Figure 9:
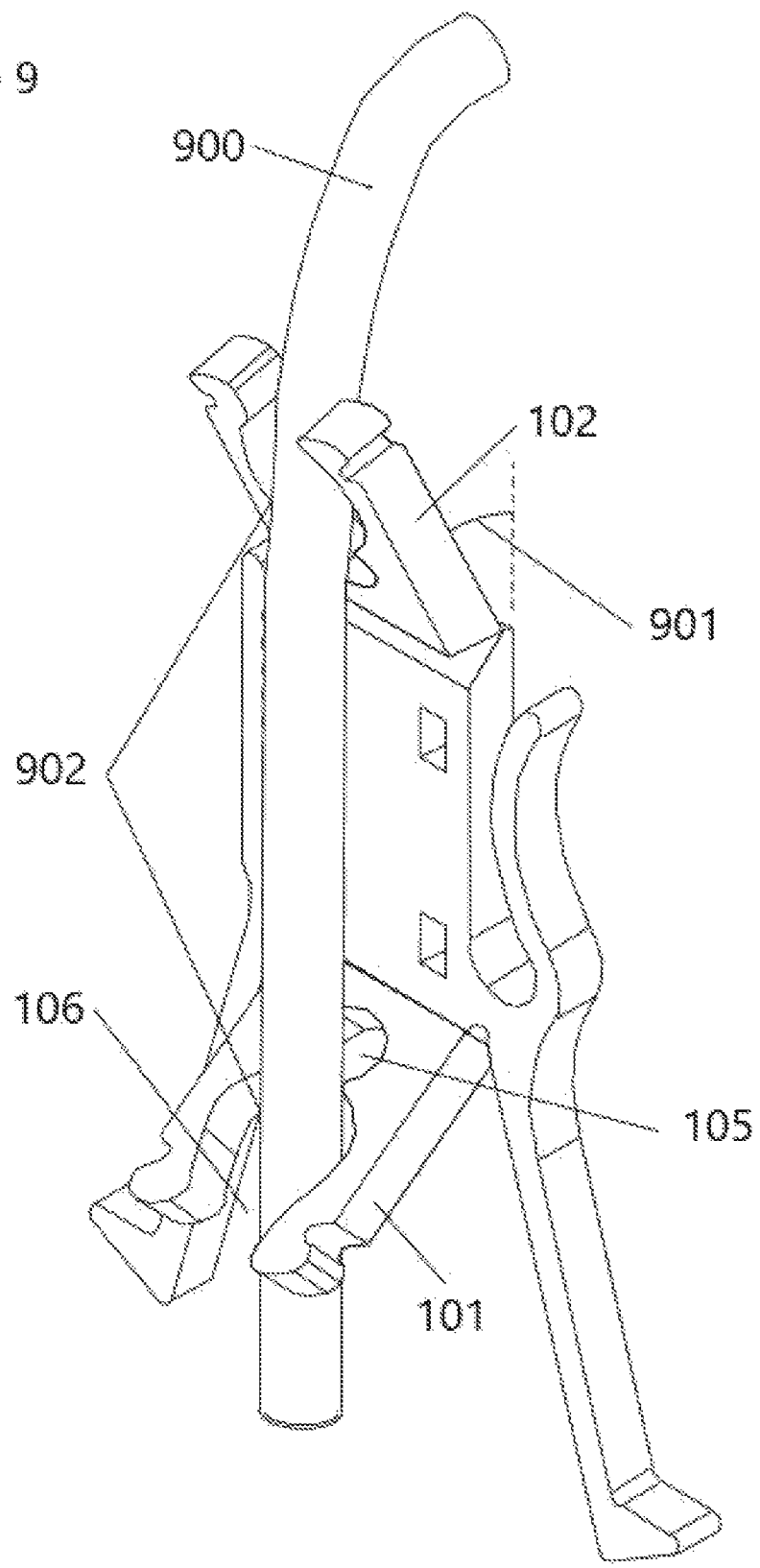
FIG. 9 shows the hose clamping device of FIG. 2 with a section of hose clamped into the end pieces that are partially folded to engage the hose.

FIG. 9 shows the hose clamping device of FIG. 2 in an alternative configuration with a section of hose 900 clamped into the end pieces 108 and 109 that are partially folded, thereby forming an angle 901 out of the plane of the central region 100 that is less than 90 degrees, and, such that the edges 902 of slot regions 105 and 106 engage the external surface of hose 900. This configuration enables a wider range of tubing sizes to be used with the hose clamping device.

A clip for removably attaching a hose to a mounting surface of a receiving vessel is described comprising a rectangular central region (100) having a front surface, a rear surface, top and bottom surfaces and first and second side surfaces with end pieces (101, 102) flexibly attached (103) to the front and rear surfaces of the central region, the end pieces having circular or elliptical slots (105, 106) for receiving and gripping said hose and various devices (108-110) attached to the top, bottom, first or second side surfaces of the central region for attaching the central region (100) to the mounting surface of the receiving vessel. The central region (100) includes a plurality of holes (104) directed from the top surface to the bottom surface and the hose is alternatively attached to the top surface of the central region (100) using flexible ties (801) inserted through the holes and around the hose. These holes and flexible ties can also be used to attach the central region (100) to a suitable mounting surface of a receiving vessel adjacent to the bottom surface of the central region. The central region (100) is otherwise attached to the mounting surface of a receiving vessel using devices such as a curved spring clip (109) for attaching the central region (100) to the interior surface of a receiving vessel having a rolled edge thicker than the wall of the vessel; a straight spring clip having raised ridges (108) for attaching the central region (100) to the interior surface of the mouth of a receiving vessel having a screw-on top, the ridges engaging with threads in the mouth; or a pair of flexible prongs (110) for attaching the central region (100) to the interior surface of the mouth of a bottle-shaped receiving vessel.

SUMMARY

A device is described that can be employed to clamp a hose to the interior surface of a vessel intended to receive the liquid discharged from the hose. A one-piece device includes a central region incorporating end pieces that include circular slots that accept a range of hose/tubing sizes and clamp the hose/tubing to the central region. The central region also incorporates a number of clip-type devices at its edges that serve to securely attach the central region to the interior surface of the mouth of a receiving vessel.

What is claimed is:

1. A clip for removably attaching a hose to a mounting surface of a receiving vessel comprising:
   a) a rectangular central region having a front surface, a rear surface, top and bottom surfaces and first and second side surfaces;
   b) end pieces flexibly attached to the front and rear surfaces of said central region, said end pieces having circular or elliptical slots for receiving and gripping said hose; and
   c) clip-type devices attached to said central region, wherein the clip-type devices comprise:
      i) a curved spring clip for attaching said central region to an interior surface of a cylindrical receiving vessel having a thin wall and a rolled edge thicker than the wall of the vessel, and,
      ii) a straight spring clip having raised ridges for attaching said central region to an interior surface of a mouth of the receiving vessel, said mouth having external threads that engage a screw-on top, said ridges engaging with threads on said mouth, and
      iii) a pair of flexible prongs for attaching said central region to an interior surface of a mouth of a bottle-shaped receiving vessel.

2. The clip of claim 1 wherein the central region includes a plurality of holes directed from the top surface to the bottom surface of the central region and flexible ties are inserted through the holes and around said hose to attach the hose to the top surface of the central region.

3. The clip of claim 1 wherein the central region includes a plurality of holes directed from the top surface to the bottom surface and flexible ties are inserted through said holes at said top surface for attaching said central region to a mounting surface adjacent to said bottom surface.

* * * * *